(12) United States Patent
Abdul Jabbar

(10) Patent No.: US 12,322,811 B2
(45) Date of Patent: Jun. 3, 2025

(54) METAL-SUPPORTED ANODE FOR SOLID OXIDE FUEL CELL

(71) Applicant: Nissan North America, Inc., Franklin, TN (US)

(72) Inventor: Mohammed Hussain Abdul Jabbar, Farmington Hills, MI (US)

(73) Assignee: NISSAN NORTH AMERICA, INC., Franklin, TN (US)

( * ) Notice: Subject to any disclaimer, the term of this patent is extended or adjusted under 35 U.S.C. 154(b) by 0 days.

(21) Appl. No.: 17/389,161

(22) Filed: Jul. 29, 2021

(65) Prior Publication Data

US 2023/0035943 A1 Feb. 2, 2023

(51) Int. Cl.
| | |
|---|---|
| *H01M 8/1226* | (2016.01) |
| *H01M 4/86* | (2006.01) |
| *H01M 4/88* | (2006.01) |
| *H01M 8/12* | (2016.01) |

(52) U.S. Cl.
CPC ....... *H01M 4/8657* (2013.01); *H01M 4/8621* (2013.01); *H01M 4/8825* (2013.01); *H01M 8/1226* (2013.01); *H01M 2008/1293* (2013.01); *H01M 2250/20* (2013.01); *H01M 2300/0077* (2013.01)

(58) Field of Classification Search
CPC ............. H01M 4/8621; H01M 4/8657; H01M 4/8825; H01M 2008/1293; H01M 2250/20; H01M 2300/0077; H01M 8/1226; Y02E 60/50

See application file for complete search history.

(56) References Cited

U.S. PATENT DOCUMENTS

2005/0221153 A1* 10/2005 Sugimoto ........... H01M 8/0232
 429/495
2007/0065701 A1* 3/2007 Cable .................... C04B 35/486
 429/495

(Continued)

FOREIGN PATENT DOCUMENTS

| CN | 113161566 A | * | 7/2021 |
|---|---|---|---|
| EP | 1334528 B1 | | 2/2011 |

(Continued)

OTHER PUBLICATIONS

Schiller, Günter, et al. "Current Status of Metallic Substrate Supported Thin-Film SOFC at DLR Stuttgart." ECS Proceedings vols. 2001.1 (2001): 885 (Year: 2001).*

(Continued)

*Primary Examiner* — Ekandra S. Miller-Cruz
*Assistant Examiner* — Jared Hansen
(74) *Attorney, Agent, or Firm* — Global IP Counselors, LLP

(57) ABSTRACT

A metal-supported anode for a solid oxide fuel cell is provided that includes a metal substrate having at least one hole formed therein, and an anode material formed on a first surface of the metal substrate. The anode material is also formed within each of the at least one hole. The at least one hole extends from the first surface of the metal substrate to a second surface of the metal substrate opposite the first surface, and the at least one hole has a different size at the first surface of the metal substrate than at the second surface of the metal substrate.

23 Claims, 8 Drawing Sheets

(56) References Cited

U.S. PATENT DOCUMENTS

| | | | | |
|---|---|---|---|---|
| 2009/0061272 A1* | 3/2009 | Blennow | ............ | H01M 4/9066 |
| | | | | 252/521.1 |
| 2012/0121999 A1* | 5/2012 | Laurencin | ........... | H01M 4/8642 |
| | | | | 429/480 |
| 2019/0088969 A1* | 3/2019 | Koizumi | ............ | H01M 8/1253 |
| 2020/0328429 A1* | 10/2020 | Echigo | ................ | H01M 4/8657 |
| 2021/0028478 A1* | 1/2021 | Echigo | ................ | H01M 8/0494 |
| 2023/0110742 A1* | 4/2023 | Echigo | ................ | H01M 8/0232 |
| | | | | 429/512 |

FOREIGN PATENT DOCUMENTS

| | | | |
|---|---|---|---|
| EP | 1851815 B1 | | 12/2011 |
| EP | 1608605 B1 | | 8/2013 |
| EP | 1497877 B1 | | 6/2017 |
| GB | 2400723 A | | 10/2004 |
| JP | 2004273213 A | * | 9/2004 |
| KR | 20150017894 A | * | 2/2015 |

OTHER PUBLICATIONS

Zhan, Zhongliang, et al. "A reduced temperature solid oxide fuel cell with nanostructured anodes." Energy & Environmental Science 4.10 (2011): 3951-3954 (Year: 2011).*

Chen, Yan. "Scandia and ceria stabilized zirconia based electrolytes and anodes for intermediate temperature solid oxide fuel cells: manufacturing and properties." (2013) (Year: 2013).*

Haydn, Markus, et al. "Multi-layer thin-film electrolytes for metal supported solid oxide fuel cells." Journal of Power Sources 256 (2014): 52-60 (Year: 2014).*

Dokmaingam, Pannipha. "Configuration development of Autothermal solid oxide fuel cell: A Review." Engineering Journal 19.2 (2015): 1-13 (Year: 2015).*

KR20150017894A, Kwon, "Oxidizing electrode direction supporting substrates and manufacturing method of oxidizing electrode direction supporting substrates", machine English translation retrieved from https://worldwide.espacenet.com Date: Dec. 13, 2022 (Year: 2015).*

Liu, Mingfei, Franklin Uba, and Ying Liu. "A high-performance solid oxide fuel cell with a layered electrolyte for reduced temperatures." Journal of the American Ceramic Society 103.9 (2020): 5325-5336 (Year: 2020).*

Singh, Prabhakar, and Boxun Hu. Advanced Anode for Internal Reforming and Thermal Management in Solid Oxide Fuel Cells. Univ. of Connecticut, Storrs, CT (United States), 2020 (Year: 2020).*

CN113161566A, Bao Chongxi, et al., "Preparation method of metal supporting plate for fuel cell", machine English translation retrieved from https://worldwide.espacenet.com Date: Dec. 13, 2022 (Year: 2021).*

American Elements Nickel Oxide-ScCeSZ Anode, retrieved from https://www.americanelements.com/ on Feb. 7, 2024, with publication date of 2017 (Year: 2017).*

JP2004273213A, Hara, et al. "Unit cell for fuel cells, its manufacturing method, and solid oxide fuel cell", machine English translation, retrieved from https://worldwide.espacenet.com/ Date: Jan. 23, 2025 (Year: 2004).*

* cited by examiner

METAL-SUPPORTED ANODE FOR SOLID OXIDE FUEL CELL

BACKGROUND

Field of the Invention

The present invention generally relates to a metal-supported anode for a solid oxide fuel cell, and a solid oxide fuel cell including the metal-supported anode. The anode includes a metal substrate and an anode material. The metal substrate has at least one hole formed therein, and the anode material is formed on a first surface of the metal substrate and within each of the at least one hole. The at least one hole extends from the first surface of the metal substrate to a second surface of the metal substrate opposite the first surface, and the at least one hole has a different size at the first surface of the metal substrate than at the second surface of the metal substrate.

Background Information

Solid oxide fuel cells ("SOFC") are desirable because they have combined high heat and power efficiency, generate low emissions and have a relatively low cost. However, SOFCs require a high operating temperature in order for oxygen ions to conduct, so they undesirably require longer start-up times and have mechanical and chemical compatibility issues. Furthermore, conventional SOFCs are very heavy due to conventional thick ceramic anode supports and therefore cannot be used in applications such as drones and electric vehicles (EVs). Conventional SOFCs are also made of ceramics, so they are brittle and could break when a drone lands or during harsh driving conditions.

In order to improve the strength of SOFCs, metal-supported SOFCs have been provided in which the anode of the fuel cell is supported by a metal substrate. Conventionally, a metal substrate is provided on the opposite side of the anode from the electrolyte. However, these fuel cells are very heavy due to the thickness required for the metal substrate, and, thus, such fuel cells cannot be used in applications such as drones or EVs where very thin cells are required to achieve high volumetric power density. Conventional metal-supported SOFCs also have sealing issues due to the use of adhesives for stacking of the electrolyte and the anode on metal bipolar plates.

Therefore, further improvement is needed to sufficiently reduce the thickness of the SOFC while maintaining sufficient strength, allowing for low temperature operation, increasing the range of fuels that can be used with the SOFC, and eliminating sealing issues. In particular, it is desirable to reduce the thickness of the metal substrate used to support the anode of the SOFC without adversely affecting the strength or other properties of the metal-supported SOFC.

SUMMARY

It has been discovered that the thickness of the metal substrate in the metal-supported SOFC can be reduced by providing an anode in which at least one hole having a different size at one surface than at the other is provided in the metal substrate. The at least one hole is infiltrated with anode material such that the anode material is provided within each of the at least one hole and on the surface between the metal substrate and the electrolyte.

In particular, it has been discovered that an anode, in which at least one hole having a different size at one surface than at the other is provided in the metal substrate and anode material is provided within each of the at least one hole and on the surface between the metal substrate and the electrolyte, can be incorporated into a SOFC to reduce the thickness of the metal substrate and thereby reduce the overall weight of the SOFC while still maintaining sufficient strength. Therefore, it is desirable to provide a solid oxide fuel cell that includes such an anode.

In view of the state of the known technology, one aspect of the present disclosure is to provide an anode including a metal substrate and an anode material. The metal substrate has at least one hole formed therein, and the anode material is formed on a first surface of the metal substrate and within each of the at least one hole. The at least one hole extends from the first surface of the metal substrate to a second surface of the metal substrate opposite the first surface, and the at least one hole has a different size at the first surface of the metal substrate than at the second surface of the metal substrate.

Another aspect of the present disclosure is to provide a solid oxide fuel cell including a metal-supported anode. The solid oxide fuel cell includes a cathode comprising a cathode material, an electrolyte comprising a solid oxide ceramic material, and an anode including a metal substrate. The metal substrate has at least one hole formed therein, and an anode material is formed on a first surface of the metal substrate and within each of the at least one hole. The at least one hole extends from the first surface of the metal substrate to a second surface of the metal substrate opposite the first surface, and the at least one hole has a different size at the first surface of the metal substrate than at the second surface of the metal substrate.

By forming the at least one hole such that the size is different at a first surface than at an opposite surface of the metal substrate, easy gas access during operation can be facilitated. In particular, at the bottom surface of the metal substrate, a stagnant layer is formed. Therefore, if the holes are big near the bottom surface of the metal substrate, gas access can be improved as compared to conventional pores. However, if the holes near the electrolyte on the top surface of the metal substrate are made smaller than the holes at the bottom surface, the thickness of the electrolyte can be reduced and cracking of the electrolyte due to internal stress of the solid oxide ceramic material can be prevented.

Furthermore, conventional metal-supported SOFCs break during repeated heating and cooling cycles. In contrast, by providing the at least one hole such that the size is different at a first surface than at an opposite surface of the metal substrate, the electrolyte in the solid oxide fuel cell can be made intact to withstand several heating and cooling thermal cycles. In addition, the claimed configuration of the at least one hole having a different size at a first surface than at an opposite surface of the metal substrate facilitates a rapid start time of less than five minutes for a solid oxide fuel cell. This rapid start time is advantageous in applications involving load following conditions and transient loads such as mountain driving in a vehicle.

A further aspect of the present disclosure is to provide a method of forming a solid oxide fuel cell. The method including forming at least one hole in a metal substrate, depositing an electrolyte on a first surface of the metal substrate with the at least one hole formed therein, depositing a cathode on the electrolyte, and infiltrating the metal substrate, with the at least one hole formed therein, with an anode material. The electrolyte includes a solid oxide ceramic material. The cathode includes a cathode material. The metal substrate is infiltrated with the anode material on a second surface of the metal substrate opposite the first surface such that a layer of the anode material is formed between the electrolyte and the first surface of the metal substrate and such that the anode material is provided within each of the at least one hole. The at least one hole extends from the first surface of the metal substrate to the second surface of the metal substrate, and the at least one hole has a different size at the first surface of the metal substrate than at the second surface of the metal substrate.

BRIEF DESCRIPTION OF THE DRAWINGS

Referring now to the attached drawings which form a part of this original disclosure:

FIG. 2b shows a SEM image of the metal substrate of FIG. 2a;

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
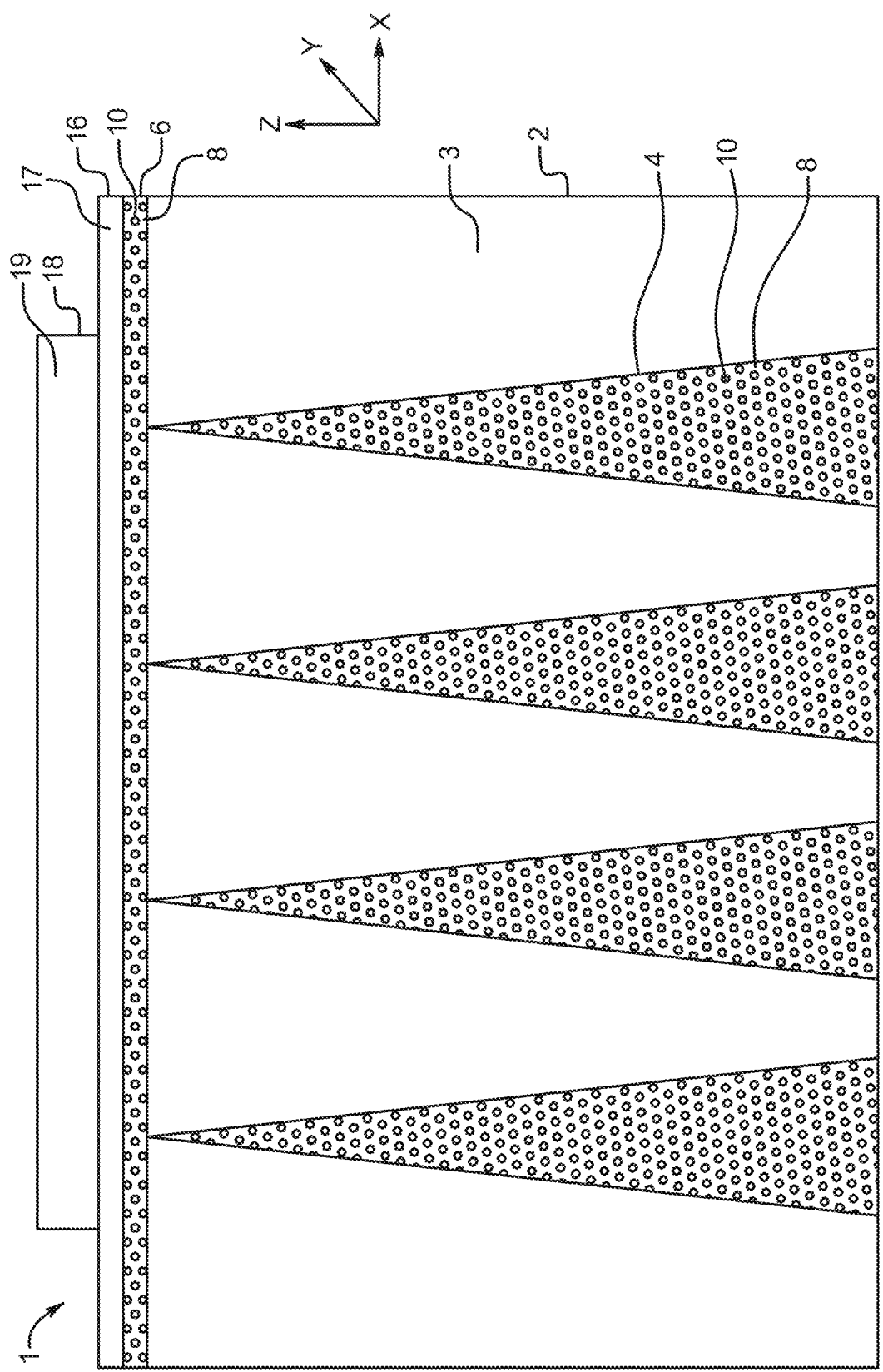
FIG. 1 is a cross-sectional view of a solid oxide fuel cell including a metal substrate according to one embodiment.

Referring initially to FIG. 1, a solid oxide fuel cell 1 is illustrated that includes a metal substrate 2, an anode 6, an electrolyte 16 and a cathode 18 in accordance with a first embodiment. The solid oxide fuel cell 1 can be incorporated in a drone, an electric vehicle, a combined heat-generating and power-generating device, or any other suitable mobile device.

The metal substrate 2 is formed of a metal 3 and has a plurality of holes 4 formed therein. The metal 3 is preferably any suitable metal for use in a metal-supported SOFC. For example, the metal 3 may be stainless steel such as SS type 440. The metal 3 has a porosity of approximately 30-50%. The metal 3 has a thickness of approximately 250-600 µm, preferably no greater than 350 µm. For example, the metal 3 has a thickness of 300 µm in the Z-direction and a width of 30 mm in the X-direction.

As shown in FIG. 1, the plurality of holes 4 each has a different size at one surface of the metal substrate 2 than at the opposite surface of the metal substrate 2. For example, the plurality of holes 4 each has a diameter of approximately 40-60 µm at the bottom surface of the metal substrate 2 and a diameter of approximately 5-20 µm at the top surface of the metal substrate 2 that is in contact with the anode 6.

The plurality of holes 4 in the metal substrate 2 may be formed by laser drilling holes in the metal 3. The holes 4 are not formed at the edge of the metal substrate 2 and instead are formed at a distance of 2-5 mm from the edges of the metal substrate 2 in the X-direction as shown in FIG. 1. Preferably, the holes 4 do not make up more than 30-50% of the surface area of the metal substrate 2. As shown in FIG. 1, the holes 4 each have a V-shape. However, it should be understood that the holes 4 may have any suitable shape in which the diameter of the hole is different at one surface of the metal substrate 2 than at the opposite surface. Furthermore, although the holes 4 in FIG. 1 each have a uniform shape and size, it should be understood that the plurality of holes 4 in the metal substrate 2 may have varying shapes and sizes, as long as the diameter of each of the holes 4 is different at one surface of the metal substrate 2 than at the opposite surface of the metal substrate 2. Preferably, the diameter of the holes 4 is greater at the bottom surface of the metal substrate 2 than at the top surface of the metal substrate 2 that is closer to the electrolyte 16 than the bottom surface.

The anode 6 is formed of a porous anode material 8 having a plurality of pores 10 formed therein. The anode 6 is preferably formed via electrophoretic deposition (EPD) of the porous anode material 8 on the metal substrate 2 in the Z-direction. The anode 6 has a thickness of approximately 2.5-15 µm, preferably 7-15 µm in the Z-direction.

As shown in FIG. 1, the porous anode material 8 is formed on the top surface of the metal substrate 2 and within the holes 4 in the metal substrate 2. The porous anode material 8 has a porosity of approximately 30-50%. The porous anode material 8 includes a metal oxide and a solid oxide ceramic material. For example, the metal oxide may be nickel oxide (NiO), and the solid oxide ceramic material may be scandia ceria stabilized zirconia (ScCeSZ). The porous anode material 8 includes approximately 40-60% by volume of NiO and approximately 40-60% by volume of ScCeSZ. The porous anode material 8 preferably includes 50% by volume of NiO and 50% by volume of ScCeSZ. However, the porous anode material 8 may also include additives such as tin (Sn). It should be understood that the ScCeSZ material also includes gadolinium (Gd) as a dopant for the ceria (CeO) in the ScCeSZ material. The pores 10 have a size or diameter of approximately 1-5 µm.

The electrolyte 16 includes a solid oxide ceramic material 17. The electrolyte 16 has a thickness of approximately 5-15 µm in the Z-direction. For example, the electrolyte 16 has a thickness of 10 µm or less. The electrolyte 16 may be formed via EPD of the solid oxide ceramic material 17 on the top surface of the anode 6. By forming the electrolyte 16 via EPD, the electrolyte 16 can desirably be formed to have a small thickness.

The solid oxide ceramic material 17 can be any suitable solid oxide ceramic material. The solid oxide ceramic material 17 is dense and preferably has a porosity of 1% or less. By providing a solid oxide ceramic material 17 that is dense, the electrolyte 16 may be stacked more easily without using adhesives, thereby eliminating the undesirable sealing issues with conventional metal-supported SOFCs. For example, the solid oxide ceramic material 17 may be ScCeSZ. The solid oxide ceramic material 17 preferably has the same composition as the solid oxide material included in the anode material 8.

The cathode 18 includes a cathode material 19. The cathode 18 has a thickness of 20-30 μm in the Z-direction. The cathode 18 may be formed via EPD of the cathode material 19 on the top surface of the electrolyte 16. As with the electrolyte 16, by forming the cathode 18 via EPD, the cathode 18 can desirably be formed to have a small thickness.

The cathode material 19 can be any suitable cathode material for a SOFC. The cathode material 19 is a low temperature material that sinters at a temperature of 850° C. or less. For example, the cathode material 19 may be samarium strontium cobalt oxide (SSC), having the formula $SrSmCoO_3$, PrBaSrCoFeO, or any suitable perovskite oxide having the general formula $ABO_3$. The cathode material 19 is porous and has a porosity of 30-60%.

Figure 2A:
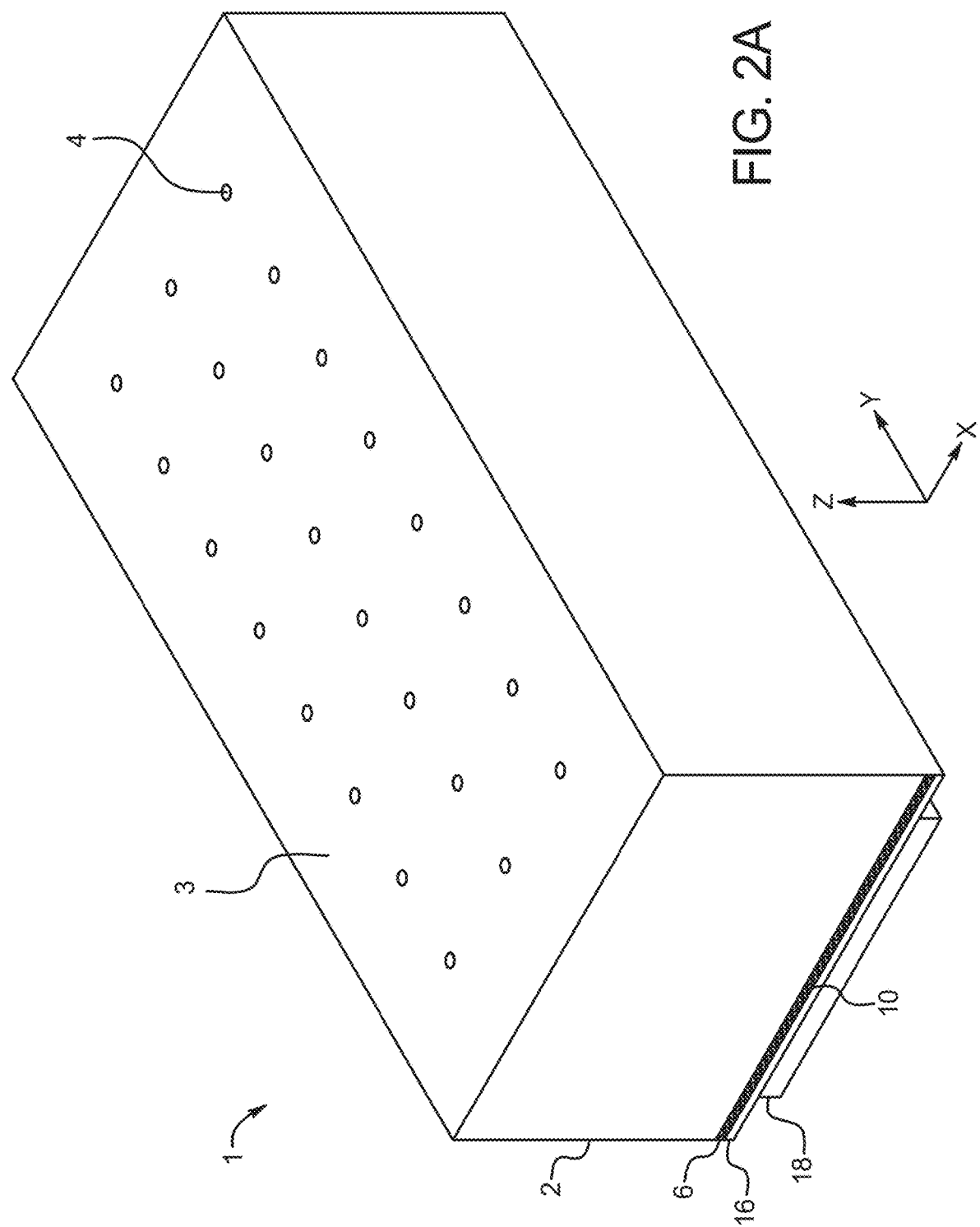
FIG. 2a is a perspective view of the solid oxide fuel cell of FIG. 1.

FIG. 2a shows a perspective view of the solid oxide fuel cell 1 of the first embodiment. As shown in FIG. 2a, the holes 4 in the metal substrate 2 are formed at approximately regular intervals in both the X-direction and the Y-direction and have a substantially uniform size on the bottom surface of the metal substrate 2. The holes 4 are also formed at a distance of 2-5 mm from the edges of the metal substrate 2 in both the X-direction and the Y-direction. Furthermore, the holes are formed with spaces therebetween in both the X-direction and Y-direction. Although not shown, it should be understood that the holes 4 also have a substantially uniform size and are formed at approximately regular intervals on the top surface of the metal substrate 2.

Figure 2B:
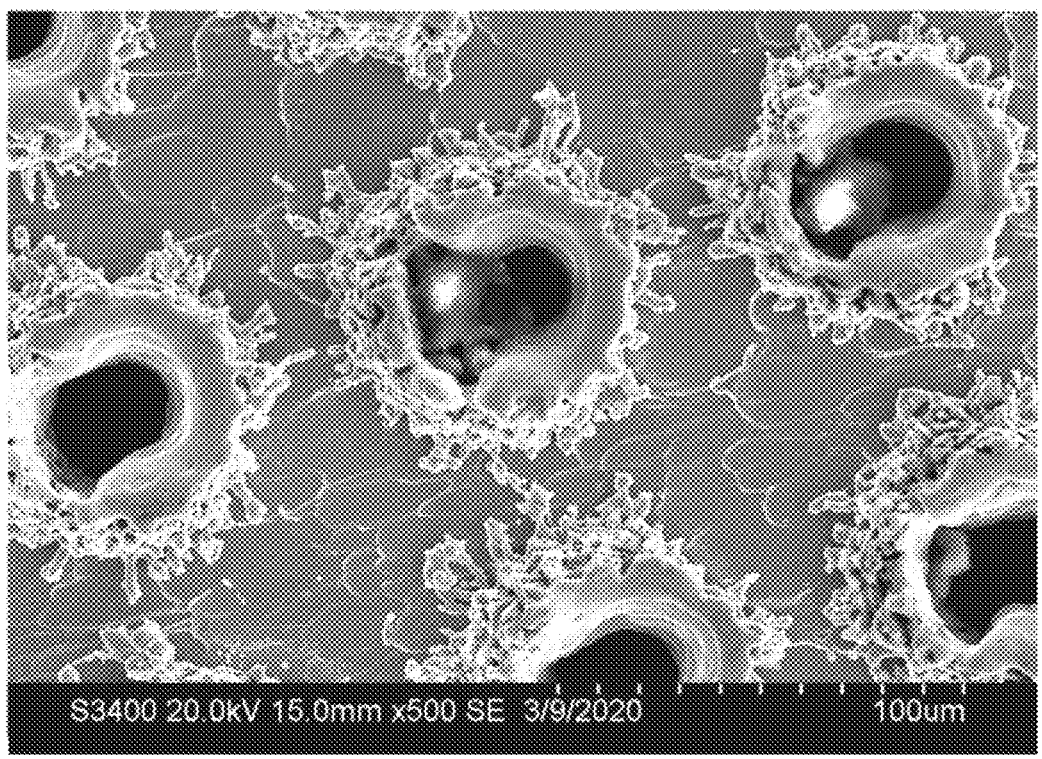
Figure 3:
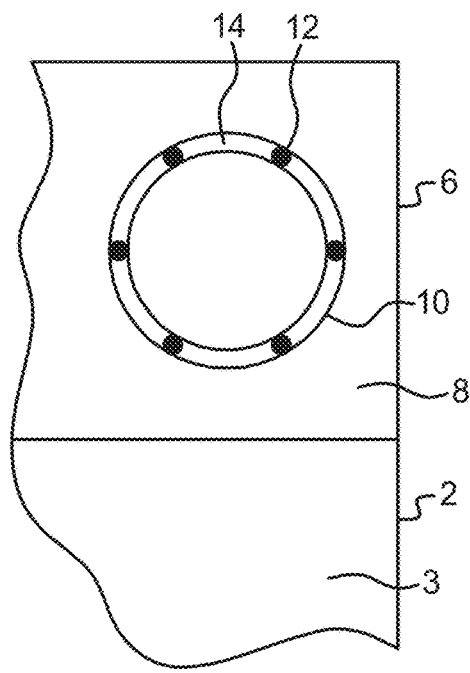
FIG. 3 is an exploded cross-sectional view of the metal substrate of FIG. 1.

FIG. 2b shows a SEM image of the metal substrate 2 of FIG. 2a. As shown in FIG. 2b, the metal substrate 2 includes a plurality of holes. The holes may be formed by laser drilling holes in the metal substrate 2 such that the holes form a V-shape and have a different size on one surface of the substrate than on the opposite surface of the substrate. However, it should be understood that any suitable method may be used to form the holes in the metal substrate 2, as long as the holes have a different size on one surface of the substrate than on the opposite surface of the substrate. Preferably, the diameter of the holes 4 is greater at the bottom surface of the metal substrate 2 than at the top surface of the metal substrate 2 that is closer to the electrolyte 16 than the bottom surface FIG. 3 shows an exploded cross-sectional view of the metal substrate 2 of the first embodiment. As shown in FIG. 3, the outer surface of the pores 10 in the anode material 8 are coated with nickel particles 12 and a coating 14 that connects the nickel particles 12. For example, the nickel particles 12 each have a size of 10-15 nm and are formed on the outer surface of the pores 10. In operation, the NiO in the anode material 8 forms the nickel particles 12 on the outer surface of the pores 10 during operation of the SOFC. The coating 14 comprises ceria (CeO) and gadolinium (Gd) as a dopant for the ceria (CeO) in the ScCeSZ material of the anode material 8. The coating 14 coats at least a portion of the outer surface of the pores 10.

Figure 4:
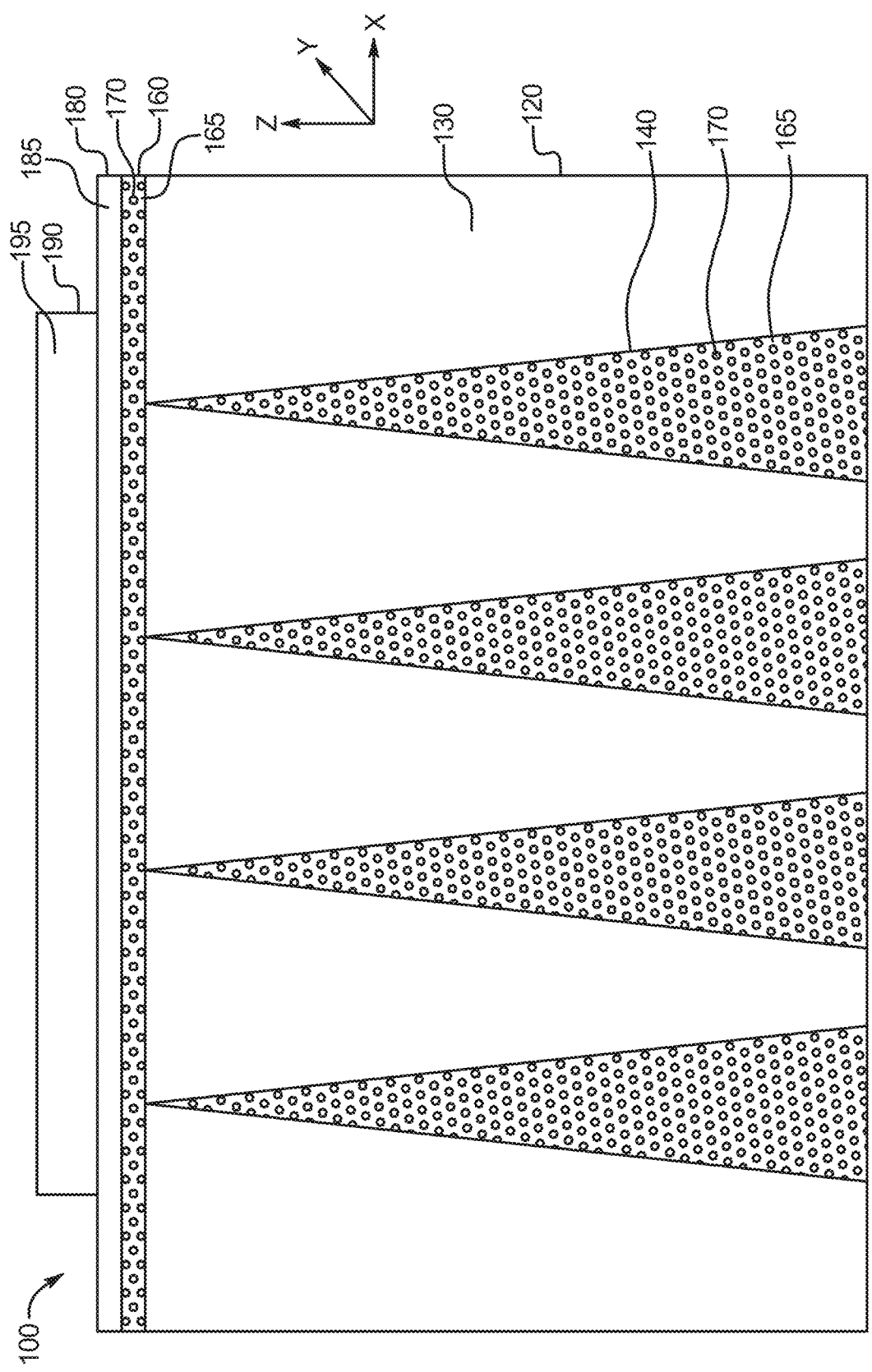
FIG. 4 is a cross-sectional view of a solid oxide fuel cell including a metal substrate according to an embodiment.

FIG. 4 shows a solid oxide fuel cell 100 in accordance with a second embodiment. The solid oxide fuel cell 100 includes a metal substrate 120, an anode 160, an electrolyte 180 and a cathode 190. As in the first embodiment, the solid oxide fuel cell 100 can be incorporated in a drone, an electric vehicle, a combined heat-generating and power-generating device, or any other suitable mobile device.

The metal substrate 120 is formed of a metal 130 and has a plurality of holes 140 formed therein. The metal 130 is preferably any suitable metal for use in a metal-supported SOFC. For example, the metal may be stainless steel such as SS type 440. The metal 130 has a porosity of approximately 30-50%. The metal 130 has a thickness of approximately 250-600 μm, preferably no greater than 350 μm. For example, the metal 130 has a thickness of 300 μm in the Z-direction and a width of 30 mm in the X-direction.

As shown in FIG. 4, the plurality of holes 140 each has a different size at one surface of the metal substrate 120 than at the opposite surface of the metal substrate 120. For example, the plurality of holes 140 each has a diameter of approximately 40-60 μm at the bottom surface of the metal substrate 120 and a diameter of approximately 5-20 μm at the top surface of the metal substrate 120 that is in contact with the anode 160.

The plurality of holes 140 in the metal substrate 120 may be formed by laser drilling holes in the metal 130. The holes 140 are not formed at the edge of the metal substrate 120 and instead are formed at a distance of 2-5 mm from the edges of the metal substrate 120 in the X-direction as shown in FIG. 4. Preferably, the holes 140 do not make up more than 30-50% of the surface area of the metal substrate 120. As shown in FIG. 4, the holes 140 each have a V-shape when viewed in the cross-sectional direction. However, it should be understood that the holes 140 may have any suitable shape in which the diameter of the hole is different at one surface of the metal substrate 120 than at the opposite surface. Furthermore, although the holes 140 in FIG. 4 each have a uniform shape and size, it should be understood that the plurality of holes 140 in the metal substrate 120 may have varying shapes and sizes, as long as the diameter of each of the holes 140 is different at one surface of the metal substrate 120 than at the opposite surface of the metal substrate 120. Preferably, the diameter of the holes 140 is greater at the bottom surface of the metal substrate 120 than at the top surface of the metal substrate 120 that is closer to the electrolyte 180 than the bottom surface.

The anode 160 is the same as the anode 6 of the first embodiment and is formed of a porous anode material 165 having a plurality of pores 170 formed therein. The anode 160 is preferably formed via electrophoretic deposition (EPD) of the porous anode material 165 on the metal substrate 120 in the Z-direction. The anode 160 has a thickness of approximately 2.5-15 μm, preferably 7-15 μm in the Z-direction.

As shown in FIG. 4, the porous anode material 165 is formed on the top surface of the metal substrate 120 and within the holes 140 in the metal substrate 120. The porous anode material 165 has a porosity of approximately 30-50%. The porous anode material 165 includes a metal oxide and a solid oxide ceramic material. For example, the metal oxide may be NiO, and the solid oxide ceramic material may be ScCeSZ. The porous anode material 165 includes approximately 40-60% by volume of NiO and approximately 40-60% by volume of ScCeSZ. The porous anode material 165 preferably includes 50% by volume of NiO and 50% by volume of ScCeSZ. However, the porous anode material 165 may optionally include additives such as tin (Sn). It should be understood that the ScCeSZ material also includes gadolinium (Gd) as a dopant for the ceria (CeO) in the ScCeSZ material. The pores 170 have a size or diameter of approximately 1-5 μm.

The electrolyte 180 is the same as the electrolyte 16 of the first embodiment and includes a solid oxide ceramic material 185. The electrolyte 180 has a thickness of approximately 5-15 μm in the Z-direction. For example, the electrolyte 180 has a thickness of 10 μm or less. The electrolyte 180 may be formed via EPD of the solid oxide ceramic material 185 on the top surface of the anode 160. By forming the electrolyte 180 via EPD, the electrolyte 180 can desirably be formed to have a small thickness.

The solid oxide ceramic material 185 can be any suitable solid oxide ceramic material. The solid oxide ceramic material 185 is dense and preferably has a porosity of 1% or less. By providing a solid oxide ceramic material 185 that is dense, the electrolyte 180 may be stacked more easily without using adhesives, thereby eliminating the undesirable sealing issues with conventional metal-supported SOFCs. For example, the solid oxide ceramic material 185 may be ScCeSZ. The solid oxide ceramic material 185 preferably has the same composition as the solid oxide material included in the anode material 165.

The cathode 190 is the same as the cathode 18 of the first embodiment and includes a cathode material 195. The cathode 190 has a thickness of 20-30 μm in the Z-direction. The cathode 190 may be formed via EPD of the cathode material 195 on the top surface of the electrolyte 180. As with the electrolyte 180, by forming the cathode 190 via EPD, the cathode 190 can desirably be formed to have a small thickness.

The cathode material 195 can be any suitable cathode material for a SOFC. The cathode material 195 is a low temperature material that sinters at a temperature of 850° C. or less. For example, the cathode material 195 may be samarium strontium cobalt oxide (SSC), having the formula $SrSmCoO_3$, $PrBaSrCoFeO$, or any suitable perovskite oxide having the general formula $ABO_3$. The cathode material 195 is porous and has a porosity of 30-60%.

Figure 5:
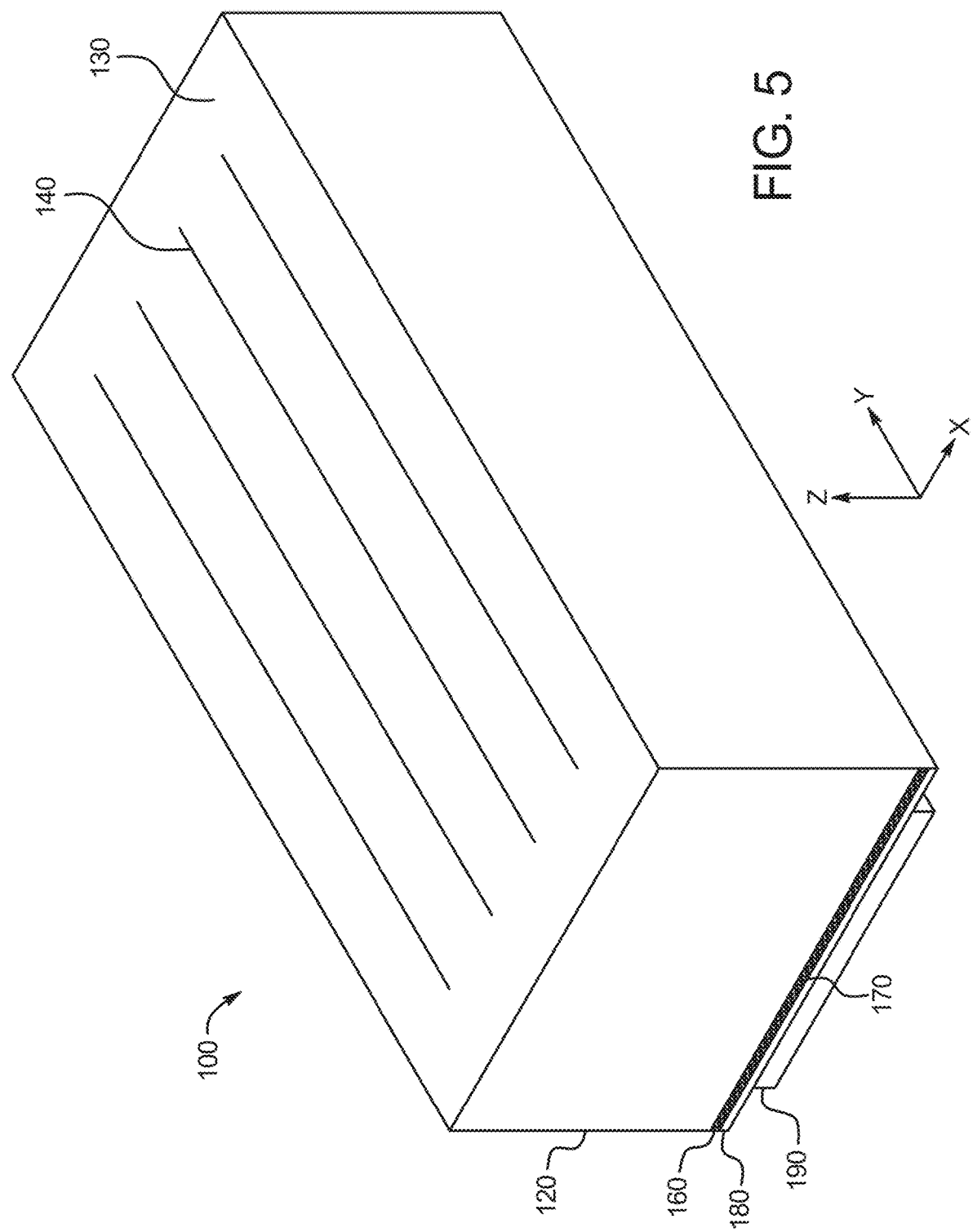
FIG. 5 is a perspective view of the solid oxide fuel cell of FIG. 4.

FIG. 5 shows a perspective view of the solid oxide fuel cell 100 of the second embodiment. As shown in FIG. 5, the holes 140 in the metal substrate 120 are formed at approximately regular intervals in the X-direction and extend along the Y-direction such that there are no spaces between holes in the Y-direction. The holes 140 have a substantially uniform size on the bottom surface of the metal substrate 120. The holes 140 are also formed at a distance of 2-5 mm from the edges of the metal substrate 120 in both the X-direction and the Y-direction. Although not shown, it should be understood that the holes 140 also have a substantially uniform size and are formed at approximately regular intervals in the X-direction on the top surface of the metal substrate 120.

Figure 6:
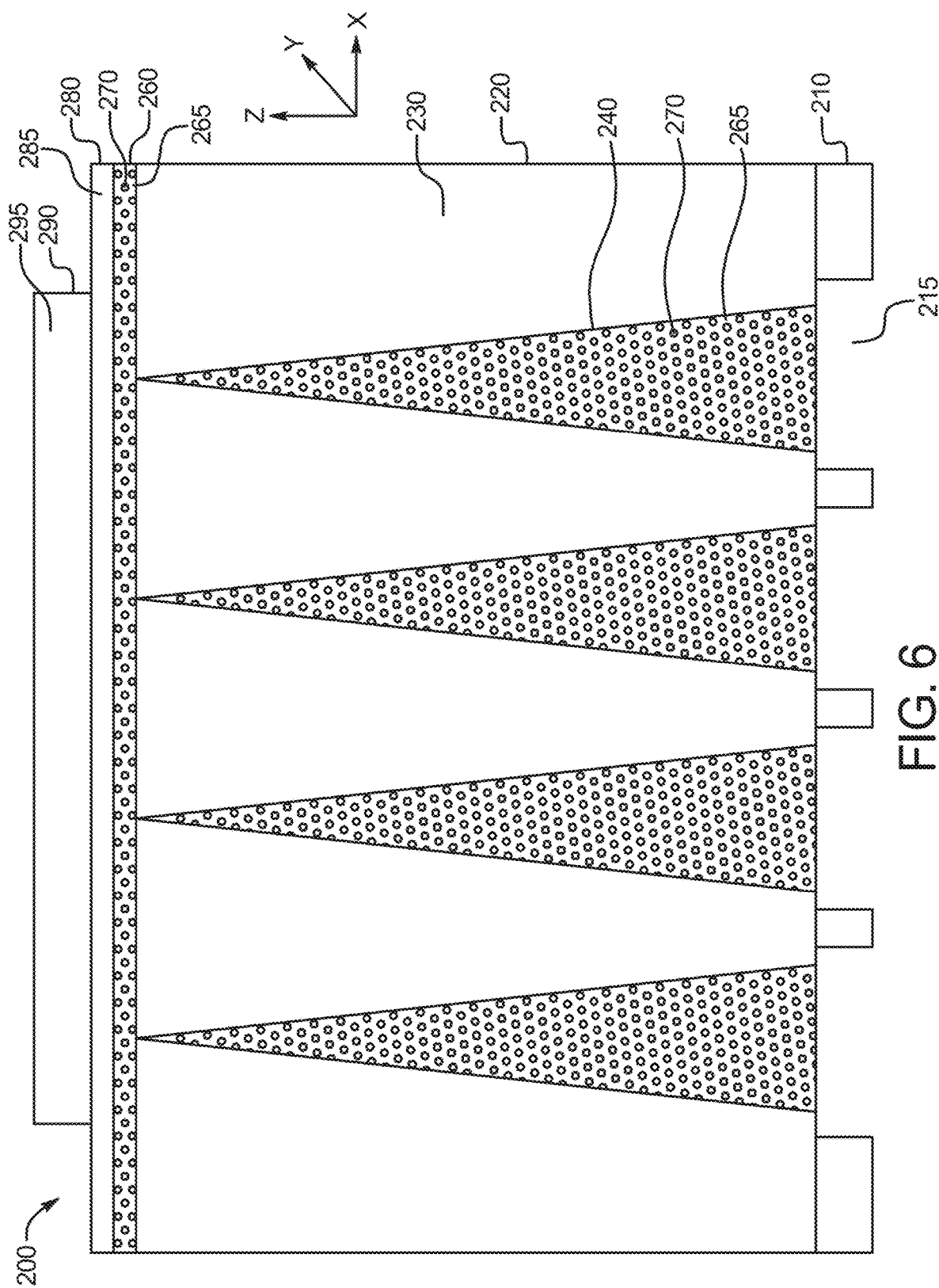
FIG. 6 is a cross-sectional view of a solid oxide fuel cell including a metal substrate and a reforming layer according to an embodiment.

FIG. 6 shows a solid oxide fuel cell 200 in accordance with a third embodiment. The solid oxide fuel cell 200 includes a reforming layer 210, a metal substrate 220, an anode 260, an electrolyte 280 and a cathode 290. As in the first and second embodiments, the solid oxide fuel cell 200 can be incorporated in a drone, an electric vehicle, a combined heat-generating and power-generating device, or any other suitable mobile device. However, because the solid oxide fuel cell 200 includes the reforming layer 210, the solid oxide fuel cell 200 can be used with various types of fuel and thus has an improved compatibility with a wider range of fuels than the solid oxide fuel cells of the first and second embodiments.

The reforming layer 210 is formed of a porous metal mesh material having a plurality of holes 215 formed therein. It should be understood that the holes 215 are not the same as the pores in the metal mesh material and that the non-hole portions of the metal mesh material are also porous. For example, the porous metal mesh material may be a copper mesh that has a porosity of 30-50%. The reforming layer has a thickness of approximately 30-50 μm in the Z-direction.

The holes 215 are larger than the holes 240 in the metal substrate 220 such that the holes 215 have a greater width in the X-direction than the holes 240. The metal mesh material is welded or otherwise joined to or put in contact with the portions of the metal substrate 220 located between holes 240. The metal mesh material is also coated with a catalyst. The catalyst includes a high entropy alloy or a mixture of high entropy alloys. For example, the catalyst includes at least one of a Ni—Cu—Co—Fe—Mn—O-doped ceria composite, a Ru—Ce—Zr alloy, a Ni—Fe-ceria alloy, and a nickel metal oxide alloy. By providing the reforming layer 210 in which a metal mesh material is coated with a catalyst, the compatibility of the solid oxide fuel cell 200 with various types of fuels can be improved. For example, by changing the catalyst that is coated on the metal mesh material of the reforming layer 210, the types of fuels used with the solid oxide fuel cell 200 can also advantageously be changed.

The metal substrate 220 is formed of a metal 230 and has a plurality of holes 240 formed therein. The metal 230 is preferably any suitable metal for use in a metal-supported SOFC. For example, the metal 230 may be stainless steel such as SS type 440. The metal 230 has a porosity of approximately 30-50%. The metal 230 has a thickness of approximately 250-600 μm, preferably no greater than 350 μm. For example, the metal 230 has a thickness of 300 μm in the Z-direction and a width of 30 mm in the X-direction.

As shown in FIG. 6, the plurality of holes 240 each has a different size at one surface of the metal substrate 220 than at the opposite surface of the metal substrate 220. For example, the plurality of holes 240 each has a diameter of approximately 40-60 μm at the bottom surface of the metal substrate 220 and a diameter of approximately 5-20 μm at the top surface of the metal substrate 220 that is in contact with the anode 260.

The plurality of holes 240 in the metal substrate 220 may be formed by laser drilling holes in the metal 230. The holes 240 are not formed at the edge of the metal substrate 220 and instead are formed at a distance of 2-5 mm from the edges of the metal substrate 220 in the X-direction as shown in FIG. 6. Preferably, the holes 240 do not make up more than 30-50% of the surface area of the metal substrate 220. As shown in FIG. 6, the holes 240 each have a V-shape. However, it should be understood that the holes 240 may have any suitable shape in which the diameter of the hole is different at one surface of the metal substrate 220 than at the opposite surface. Furthermore, although the holes 240 in FIG. 6 each have a uniform shape and size, it should be understood that the plurality of holes 240 in the metal substrate 220 may have varying shapes and sizes, as long as the diameter of each of the holes 240 is different at one surface of the metal substrate 220 than at the opposite surface of the metal substrate 220. Preferably, the diameter of the holes 240 is greater at the bottom surface of the metal substrate 220 than at the top surface of the metal substrate 220 that is closer to the electrolyte 280 than the bottom surface.

The anode 260 is formed of a porous anode material 265 having a plurality of pores 270 formed therein. The anode 260 is preferably formed via electrophoretic deposition (EPD) of the porous anode material 265 on the metal substrate 220 in the Z-direction. The anode 260 has a thickness of approximately 2.5-15 μm, preferably 7-15 μm in the Z-direction.

As shown in FIG. 6, the porous anode material 265 is formed on the top surface of the metal substrate 220 and within the holes 240 in the metal substrate 220. The porous anode material 265 has a porosity of approximately 30-50%. The porous anode material 265 includes a metal oxide and a solid oxide ceramic material. For example, the metal oxide may be NiO, and the solid oxide ceramic material may be ScCeSZ. The porous anode material 265 includes approximately 40-60% by volume of NiO and approximately 40-60% by volume of ScCeSZ. The porous anode material 265 preferably includes 50% by volume of NiO and 50% by volume of ScCeSZ. However, the porous anode material 265 may optionally include additives such as tin (Sn). It should be understood that the ScCeSZ material also includes gadolinium (Gd) as a dopant for the ceria (CeO) in the ScCeSZ material. The pores 270 have a size or diameter of approximately 1-5 μm.

The electrolyte 280 includes a solid oxide ceramic material 285. The electrolyte 280 has a thickness of approximately 5-15 μm in the Z-direction. For example, the electrolyte 280 has a thickness of 10 μm or less. The electrolyte 280 may be formed via EPD of the solid oxide ceramic material 285 on the top surface of the anode 260. By using an EPD process, the electrolyte 280 can desirably be formed to have a small thickness.

The solid oxide ceramic material 285 can be any suitable solid oxide ceramic material. The solid oxide ceramic material 285 is dense and preferably has a porosity of 1% or less. By providing a solid oxide ceramic material 285 that is dense, the electrolyte 280 may be stacked more easily without using adhesives, thereby eliminating the undesirable sealing issues with conventional metal-supported SOFCs. For example, the solid oxide ceramic material 285 may be ScCeSZ. The solid oxide ceramic material 285 preferably has the same composition as the solid oxide material included in the anode material 265.

The cathode 290 includes a cathode material 295. The cathode 290 has a thickness of 20-30 μm in the Z-direction. The cathode 290 may be formed via EPD of the cathode material 295 on the top surface of the electrolyte 280. As with the electrolyte 280, by using an EPD process, the cathode 290 can desirably be formed to have a small thickness.

The cathode material 295 can be any suitable cathode material for a SOFC. The cathode material 295 is a material that sinters at a low temperature of 850° C. or less. For example, the cathode material 295 may be samarium strontium cobalt oxide (SSC), having the formula $SrSmCoO_3$, PrBaSrCoFeO, or any suitable perovskite oxide having the general formula $ABO_3$. The cathode material 295 is porous and has a porosity of 30-60%.

Figure 7A:
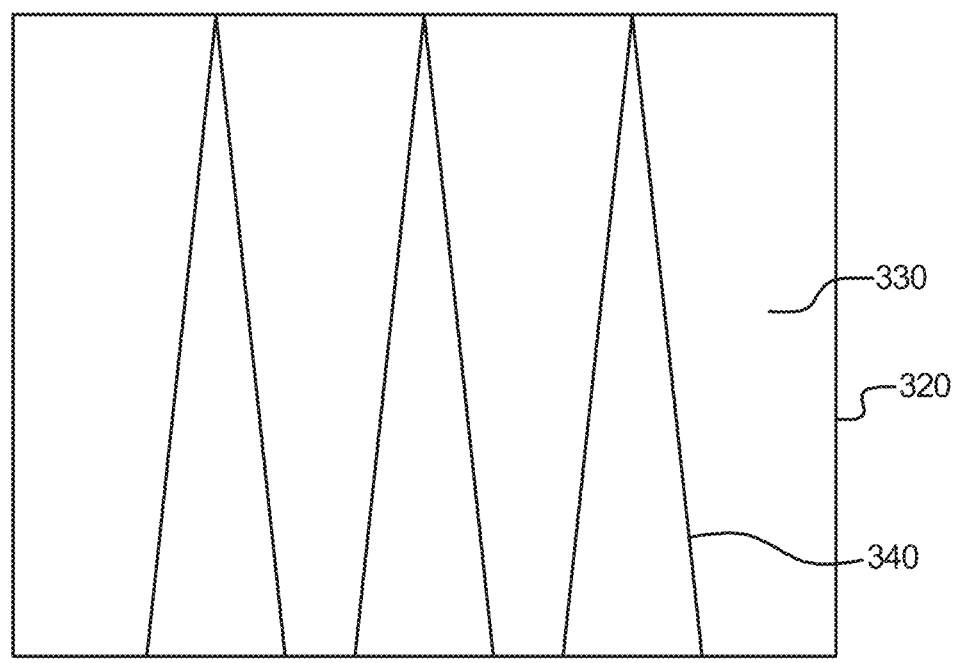
FIG. 7a is a cross-sectional view of a metal substrate in a first step of forming a solid oxide fuel cell according to an embodiment.

FIGS. 7a-7d illustrate a process of forming a solid oxide fuel cell 300 in accordance with a fourth embodiment. FIG. 7a shows a metal substrate 320 formed of a metal 330 in a first step of the process of forming the solid oxide fuel cell 300. In the first step, the metal substrate 320 is laser drilled to form a plurality of holes 340 that extend through the entire metal substrate 320 in the Z-direction. However, it should be understood that any suitable process may be used to form the holes 340 in the metal substrate 320 such that the size of the holes 340 can be controlled to be different at one surface of the metal substrate 320 than at the opposite surface of the metal substrate 320.

As in the first, second and third embodiments, the metal substrate 320 is formed of a metal 330. The metal 330 is preferably any suitable metal for use in a metal-supported SOFC. For example, the metal 330 may be stainless steel such as SS type 440. The metal 330 has a porosity of approximately 30-50%. The metal 330 has a thickness of approximately 250-600 μm, preferably no greater than 350 μm. For example, the metal 330 has a thickness of 300 μm in the Z-direction and a width of 30 mm in the X-direction.

As shown in FIG. 7a, the plurality of holes 340 are laser-drilled such that each hole has a different size at one surface of the metal substrate 320 than at the opposite surface of the metal substrate 320. For example, the plurality of holes 340 each has a diameter of approximately 40-60 μm at the bottom surface of the metal substrate 320 and a diameter of approximately 5-20 μm at the top surface of the metal substrate 320.

The plurality of holes 340 are formed such that there is a gap of at least 2-5 mm from the edges of the metal substrate 320 in the X-direction as shown in FIG. 7a. By providing this gap between the holes 340 and the edges of the metal substrate 320, sufficient space is formed to allow for sealing of the solid oxide fuel cell 300. The holes 340 are preferably formed such that they do not make up more than 30-50% of the surface area of the metal substrate 320. As shown in FIG. 7a, the holes 340 each have a V-shape. However, it should be understood that the holes 340 may have any suitable shape in which the diameter of the hole is different at one surface of the metal substrate 320 than at the opposite surface. Furthermore, although the holes 340 in FIG. 7a each have a uniform shape and size, it should be understood that the plurality of holes 340 in the metal substrate 320 may have varying shapes and sizes, as long as the diameter of each of the holes 340 is different at one surface of the metal substrate 320 than at the opposite surface of the metal substrate 320. Preferably, the diameter of the holes 340 is greater at the bottom surface of the metal substrate 320 than at the top surface of the metal substrate 320 that is closer to the electrolyte 380 than the bottom surface.

Figure 7B:
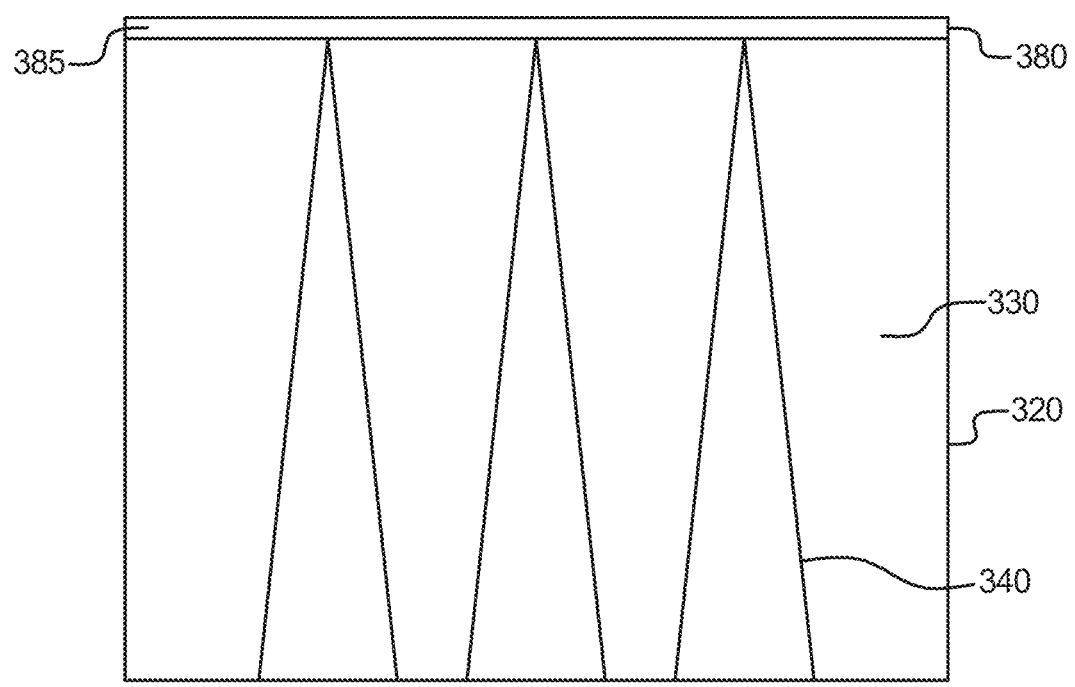
FIG. 7b is a cross-sectional view of the metal substrate and an electrolyte in a second step of forming the solid oxide fuel cell according to the embodiment.

FIG. 7b shows the metal substrate 320 and an electrolyte 380 in a second step of the process of forming the solid oxide fuel cell 300. In the second step, the electrolyte 380 is formed on a first top surface of the metal substrate 320 in the Z-direction. The electrolyte 380 has a thickness of approximately 5-15 μm in the Z-direction. The electrolyte 380 preferably has a thickness of 10 μm or less.

The electrolyte 380 is formed by electrophoretic deposition of a solid oxide ceramic material 385 on the top surface of the metal substrate 320. For example, the solid oxide ceramic material 385 is electrophoretically deposited on the top surface of the metal substrate 320 at a temperature of 1250-1350° C. in a gas comprising 5% by volume of hydrogen and 5% by volume of nitrogen. However, it should be understood that any suitable process and conditions may be used to deposit or otherwise form the solid oxide ceramic material 385 such that the electrode 380 has the desired thickness of 5-15 μm in the Z-direction. By forming the electrolyte 380 via electrophoretic deposition, the electrolyte 380 can desirably be formed to have a small thickness.

The solid oxide ceramic material 385 can be any suitable solid oxide ceramic material. The solid oxide ceramic material 385 is dense and preferably has a porosity of 1% or less. By providing a solid oxide ceramic material 385 that is dense, the electrolyte 380 may be stacked more easily without using adhesives, thereby eliminating the undesirable sealing issues with conventional metal-supported SOFCs. For example, the solid oxide ceramic material 385 may be ScCeSZ.

Figure 7C:
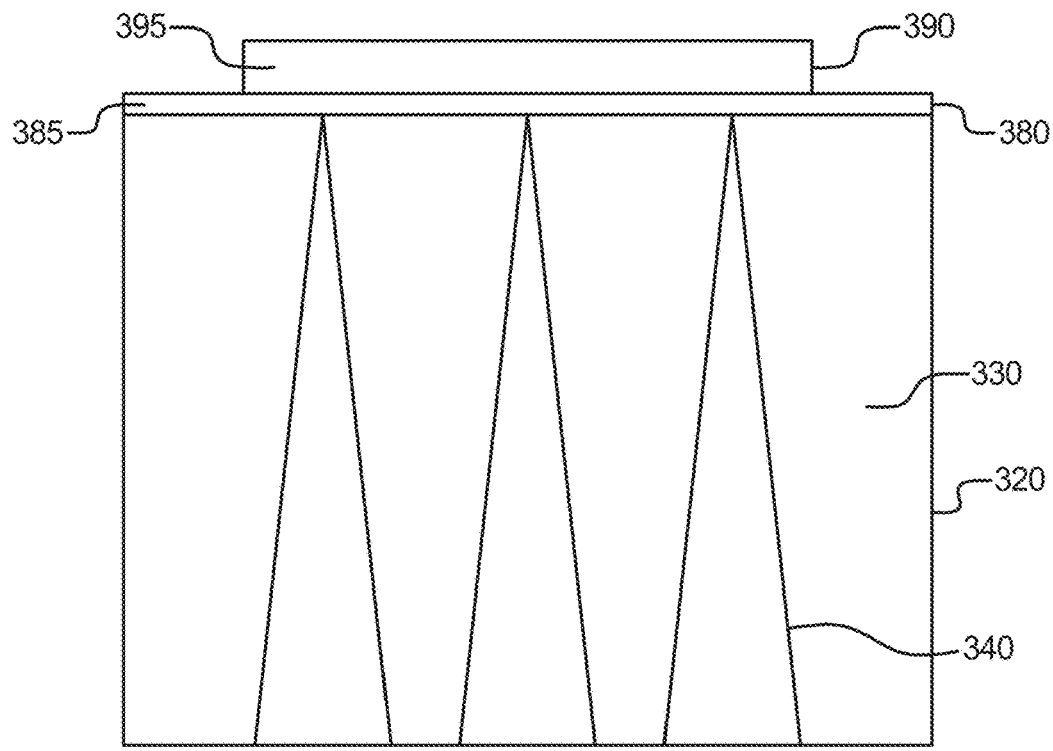
FIG. 7c is a cross-sectional view of the metal substrate, the electrolyte and a cathode in a third step for forming the solid oxide fuel cell according to the embodiment.

FIG. 7c shows the metal substrate 320, the electrolyte 380 and a cathode 390 in a third step of the process of forming the solid oxide fuel cell 300. In the third step, the cathode 390 is formed on the top surface of the electrolyte 380 in the Z-direction. The cathode 390 has a thickness of 20-30 μm in the Z-direction.

The cathode 390 is formed by electrophoretic deposition of a cathode material 395 on the top surface of the electrolyte 380. For example, the cathode material 395 is electrophoretically deposited on the top surface of the electrolyte 380 at a temperature of 850° C. in air. However, it should be understood that any suitable process and conditions may be used to deposit or otherwise form the cathode material 395 such that the cathode 390 has the desired thickness of 20-30 μm in the Z-direction. As with the electrolyte 380, by forming the cathode 390 via electrophoretic deposition, the cathode 390 can desirably be formed to have a small thickness.

The cathode material 395 can be any suitable cathode material for a SOFC. The cathode material 395 is a material that sinters at a low temperature of 850° C. or less. For example, the cathode material 395 may be samarium strontium cobalt oxide (SSC), having the formula $SrSmCoO_3$, PrBaSrCoFeO, or any suitable perovskite oxide having the general formula $ABO_3$. The cathode material 395 is porous and has a porosity of 30-60%.

Figure 7D:
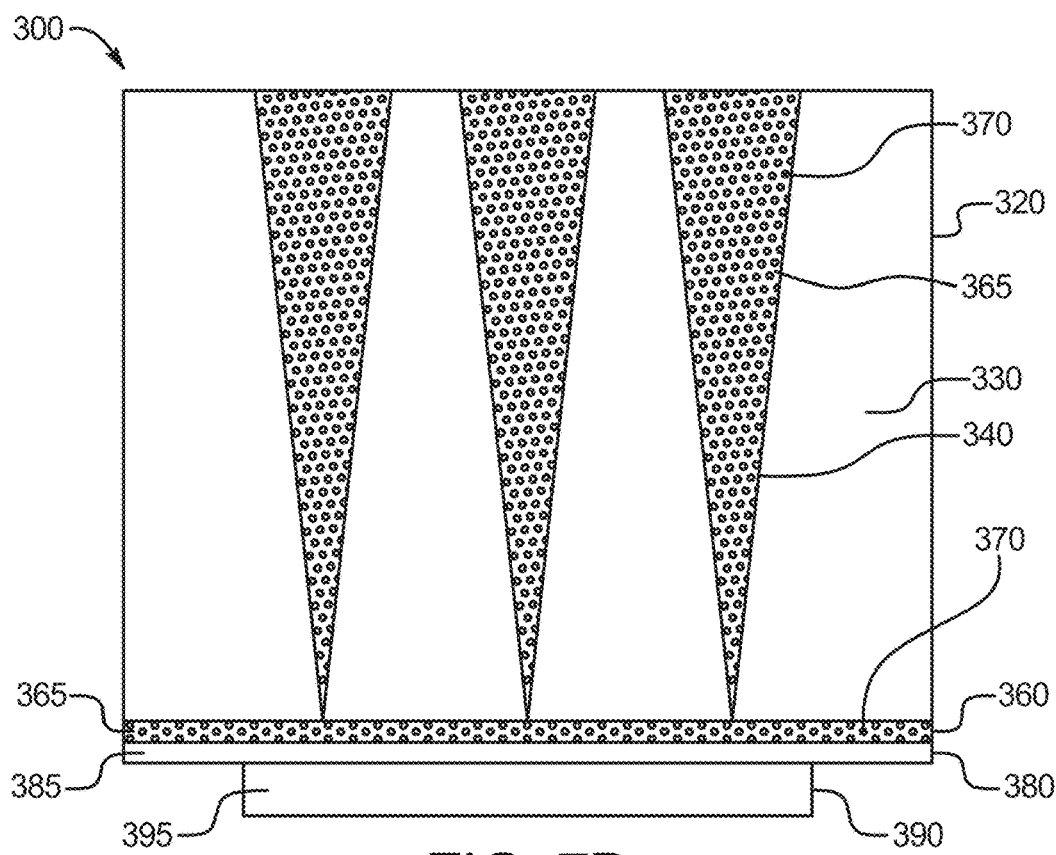
FIG. 7d is a cross-sectional view of the metal substrate, an anode, the electrolyte and the cathode in a fourth step for forming the solid oxide fuel cell according to the embodiment.

FIG. 7d shows the metal substrate 320, the electrolyte 380, the cathode 390 and an anode 360 in a fourth step of the process of forming the solid oxide fuel cell 300. In the fourth step, the metal substrate 320 is flipped to the side opposite the side on which the electrolyte 380 and the cathode 390 are formed and a second bottom surface of the metal substrate 320 is infiltrated with an anode material 365 having pores 370. The metal substrate 320 is infiltrated with the anode material 365 such that the anode material 365 is provided within the holes 340 and on the first surface of the metal substrate 320. As a result, the anode 360 comprising a layer of the anode material 365 is formed between the first surface of the metal substrate 320 and the electrolyte 380.

The anode 360 has a thickness of approximately 2.5-15 μm, preferably 7-15 μm in the Z-direction. The anode 360 is formed by electrophoretic deposition of the anode material 365 on the second bottom surface of the metal substrate 320. For example, the anode material 365 is electrophoretically deposited on the bottom surface of the metal substrate 320 at a temperature of 600-850° C. in air and penetrates the metal substrate 320 to form the anode 360 on the first surface of the metal substrate 320. However, it should be understood that any suitable process and conditions may be used to deposit or otherwise form the anode 360 on the first surface of the metal substrate 320 such that the anode 360 has the desired thickness of 2.5-15 μm in the Z-direction and such that the anode material 365 is provided within the holes 340. By depositing the anode material 365 via electrophoretic deposition, the anode 360 can desirably be formed to have a small thickness, and the anode material 365 can advantageously be provided in the holes 340 of the metal substrate 320.

The anode material 365 is formed on the first top surface of the metal substrate 320 and within the holes 340 in the metal substrate 320. The anode material 365 is porous and has a porosity of approximately 30-50%. The porous anode material 365 includes a metal oxide and a solid oxide ceramic material. For example, the metal oxide may be NiO, and the solid oxide ceramic material may be ScCeSZ. The solid oxide ceramic material in the anode material 365 preferably has the same composition as the solid oxide ceramic material 385 of the electrolyte 380. The porous anode material 365 includes approximately 40-60% by volume of NiO and approximately 40-60% by volume of ScCeSZ. The porous anode material 365 preferably includes 50% by volume of NiO and 50% by volume of ScCeSZ. However, the porous anode material 365 may optionally include additives such as tin (Sn). It should be understood that the ScCeSZ material also includes gadolinium (Gd) as a dopant for the ceria (CeO) in the ScCeSZ material. The pores 370 have a size or diameter of approximately 1-5 μm.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including," "having" and their derivatives. Also, the terms "part," "section," "portion," or "element" when used in the singular can have the dual meaning of a single part or a plurality of parts.

The terms of degree, such as "approximately" or "substantially" as used herein, mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A fuel cell anode comprising
a metal substrate having a plurality of holes formed therein; and
an anode material formed on a first surface of the metal substrate and within each of the plurality of holes such that each of the plurality of holes is infiltrated with the anode material,
the plurality of holes having a substantially uniform size and being formed at approximately regular intervals on the first surface of the metal substrate,
the plurality of holes extending from the first surface of the metal substrate to a second surface of the metal substrate opposite the first surface, and
the plurality of holes having a different size at the first surface of the metal substrate than at the second surface of the metal substrate, each of the plurality of holes having a diameter in a range of 5 to 20 micrometers at the first surface.

2. The anode according to claim 1, wherein
the anode material comprises pores and has a porosity of 30% to 50%.

3. The anode according to claim 2, wherein
the pores are coated with nickel particles.

4. The anode according to claim 1, wherein
the metal substrate comprises stainless steel.

5. The anode according to claim 1, wherein
the anode material comprises nickel oxide.

6. The anode according to claim 5, wherein
the anode material further comprises a solid oxide ceramic material, and the solid oxide ceramic material is scandia ceria stabilized zirconia.

7. The anode according to claim 5, wherein
the anode material is NiO—ScCeSZ comprising 40% by volume to 60% by volume of NiO.

8. The anode according to claim 1, wherein
the anode material formed on the first surface of the metal substrate has a thickness of 2.5 µm to 15 µm.

9. The anode according to claim 1, wherein
each of the plurality of holes has a diameter in a range of 40 to 60 micrometers at the second surface.

10. The anode according to claim 9, wherein
each of the plurality of holes is completely filled with the anode material.

11. The anode according to claim 1, wherein
each of the plurality of holes has a first opening at the first surface and a second opening at the second surface, and
each of the plurality of holes is completely filled with the anode material from the first opening to the second opening.

12. The anode according to claim 1, wherein
the anode material comprises a metal oxide and a solid oxide ceramic material.

13. A solid oxide fuel cell comprising:
a cathode comprising a cathode material;
an electrolyte comprising a first solid oxide ceramic material; and
an anode comprising:
  a metal substrate having a plurality of holes formed therein; and
  an anode material formed on a first surface of the metal substrate and within each of the plurality of holes such that each of the plurality of holes is infiltrated with the anode material,
the plurality of holes having a substantially uniform size and being formed at approximately regular intervals on the first surface of the metal substrate,
the plurality of holes extending from the first surface of the metal substrate to a second surface of the metal substrate opposite the first surface, and
the plurality of holes having a different size at the first surface of the metal substrate than at the second surface of the metal substrate, each of the plurality of holes having a diameter in a range of 5 to 20 micrometers at the first surface.

14. The solid oxide fuel cell according to claim 13, wherein
the cathode material sinters at a temperature of 850° C. or less.

15. The solid oxide fuel cell according to claim 13, wherein
the anode material comprises pores and has a porosity of 30% to 50%.

16. The solid oxide fuel cell according to claim 15, wherein
the pores are coated with nickel particles.

17. The solid oxide fuel cell according to claim 13, wherein
the metal substrate comprises stainless steel.

18. The solid oxide fuel cell according to claim 13, wherein
the anode material comprises nickel oxide.

19. The solid oxide fuel cell according to claim 13, wherein
the anode material comprises a metal oxide and a second solid oxide ceramic material, and the second solid oxide ceramic material and the first solid oxide ceramic material are the same.

20. The solid oxide fuel cell according to claim 13, wherein
the anode material formed on the first surface of the metal substrate has a thickness of 2.5 µm to 15 µm.

21. The solid oxide fuel cell according to claim 13, further comprising
a porous reforming layer comprising a metal mesh material, the porous reforming layer being joined to the metal substrate at locations where the plurality of holes are not formed.

22. The solid oxide fuel cell according to claim 21, wherein
the metal mesh is coated with a catalyst.

23. A method of forming a solid oxide fuel cell, the method comprising:
forming a plurality of holes in a metal substrate;
depositing an electrolyte on a first surface of the metal substrate with the plurality of holes formed therein, the electrolyte comprising a solid oxide ceramic material;
depositing a cathode on the electrolyte, the cathode comprising a cathode material; and
infiltrating the metal substrate, with the plurality of holes formed therein, with an anode material on a second surface of the metal substrate such that a layer of the anode material is formed between the electrolyte and the first surface of the metal substrate and such that the anode material is provided within each of the plurality of holes, the plurality of holes having a substantially uniform size and being formed at approximately regular intervals on the first surface of the metal substrate,
the second surface of the metal substrate being opposite the first surface of the metal substrate,
the plurality of holes extending from the first surface of the metal substrate to the second surface of the metal substrate, and
the plurality of holes having a different size at the first surface of the metal substrate than at the second surface of the metal substrate, each of the plurality of holes having a diameter in a range of 5 to 20 micrometers at the first surface.

* * * * *